United States Patent Office 3,264,633
Patented August 2, 1966

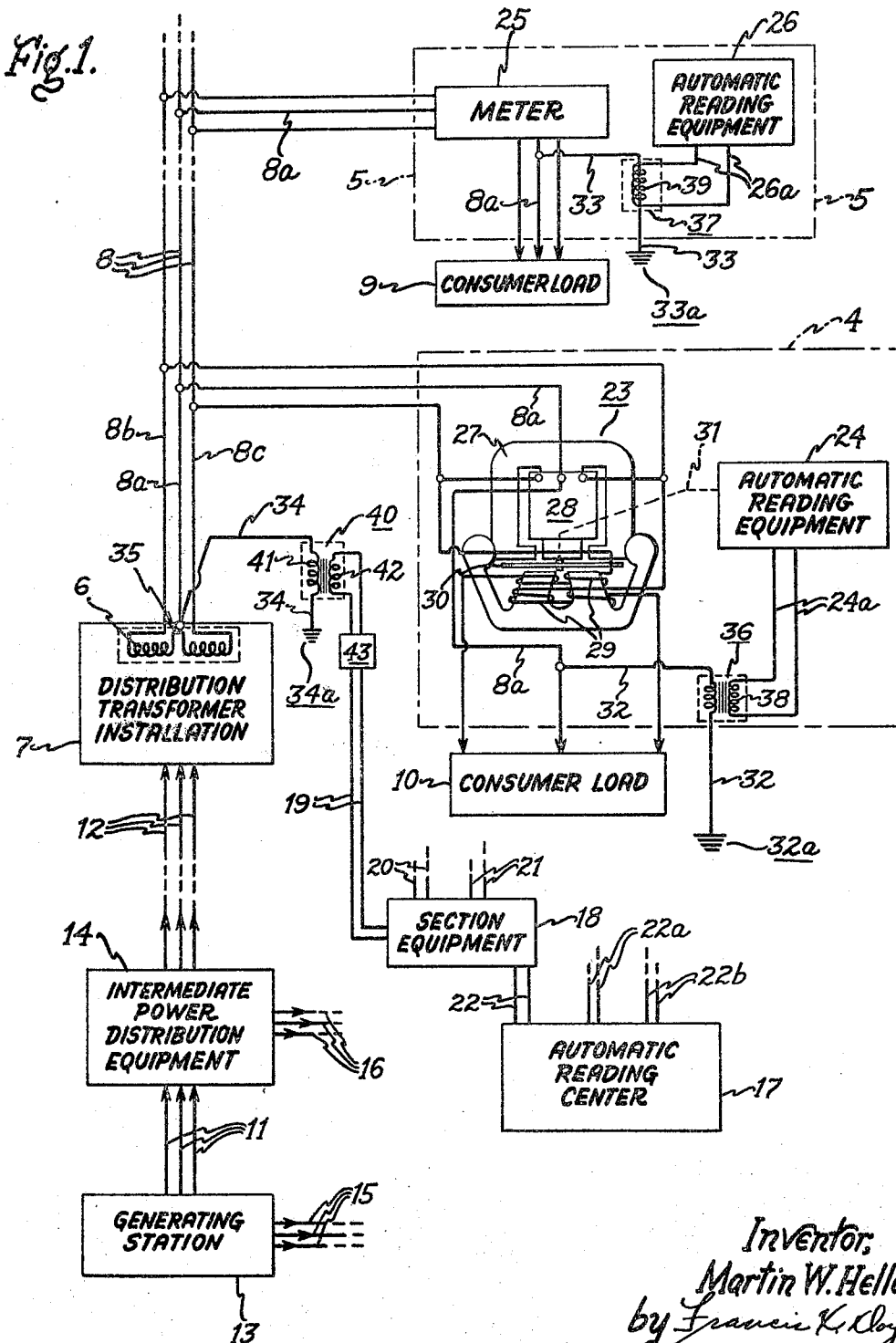

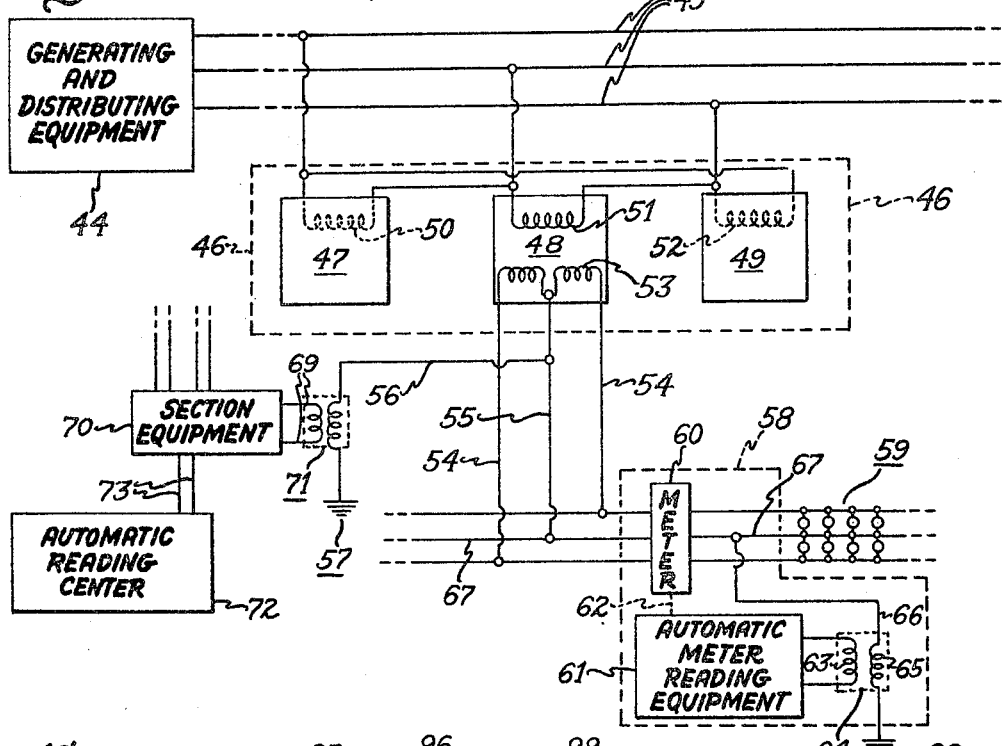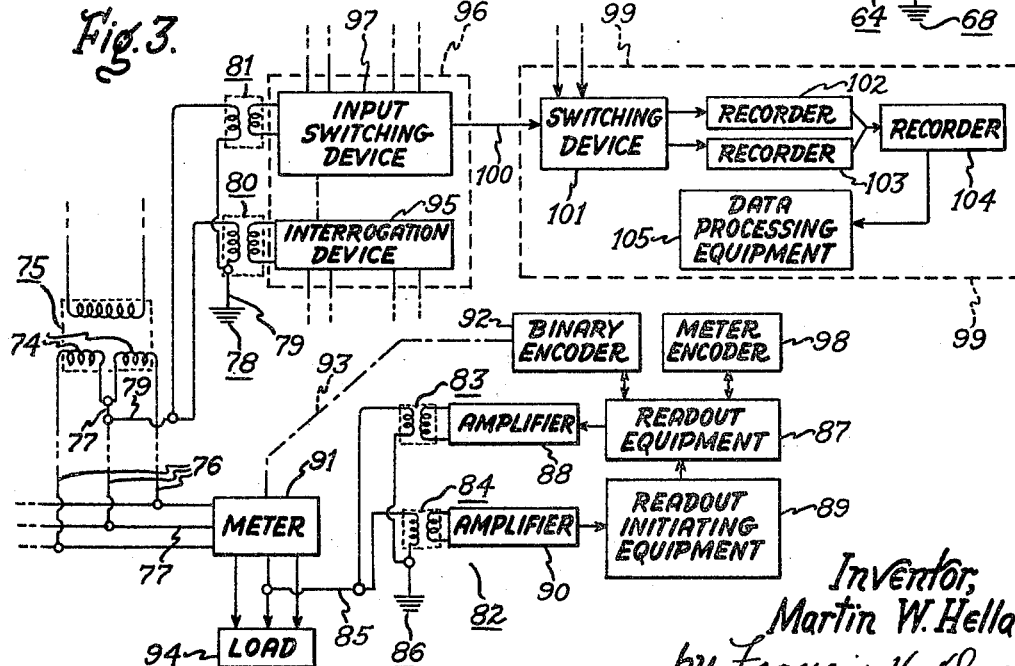

3,264,633
AUTOMATIC POWER METER READING OVER NEUTRAL POWER TRANSMISSION LINE
Martin W. Hellar, Durham, N.H., assignor to General Electric Company, a corporation of New York
Filed Mar. 22, 1961, Ser. No. 97,642
6 Claims. (Cl. 340—310)

The present invention relates to improvements in metering and, in one particular aspect, to improved apparatus for the automatic reading of utility meters in which electrical communications are established through ground paths of electrical power distribution networks.

In the utilities industries, traditional practices for the billing of customers have involved laborious calculations based upon reports by visiting meter readers, the consumptions totalized by each household meter being assessed in accordance with a predetermined rate structure, and the readings themselves being taken at infrequent intervals of a month or more. The labor costs incident to the taking of such readings, and the human labors required in the processing of the data acquired through such readings, are inescapable burdens which both the producer and consumer have been obliged to accept in the absence of more economical alternatives of equal reliability. Moreover, it is commonly the case that different increments of the production and consumption are of significantly different economic value, such that those who consume under prevailing conditions most favorable to the supplier must nevertheless bear a disproportionately large share of the total cost because they cannot be distinguished for purposes of more equitable assessments. These have been the circumstances in the electric power industry, for example, where generating and distributing equipment may function most economically under prescribed loading conditions and it should therefore be economically attractive for both the utility and consumers that the consumption be increased when it falls below such loading and that it be curtailed, or at least assessed at rates equitably offsetting the increased cost, when the optimum loading is exceeded. To some extent, the latter goal has been approached through the introduction of demand meters, such as those which register maximum kilowatt hour demand by the consumer in the interval between readings, the restrictions to or excess over prescribed limits providing the basis for appropriately lower and higher charges. For kindred reasons, it has now also become the practice to activate household electric water heaters automatically such that their loads will be absorbed under optimum economic conditions. In any event, the costs, labors and errors of human meter readers are not eliminated, and the simple totalized meter registrations are devoid of information as to the consumer's demand at any instant. Information of the latter type is important, however, not only for the billing purposes mentioned but also for the utility's purposes in planning to cope with widely varying instantaneous demand in the most effective and economical manner.

It has therefore been proposed that the prior techniques for integrating and reporting metered data be superseded by those which involve wholly automated reporting of metering data to a remote processing center, preferably within such short periodic reporting intervals that accurate and current demand information is available at any time. This may be accomplished by periodic electrical interrogation of meters which are adapted to respond by issuing binary electrical characterizations of whether or not a predetermined increment of the supply has been consumed by a load, or by issuing a binary electrical coding of the actual amount of supply consumed, or it may be accomplished by meters which are each self-excited to issue distinctive binary electrical characterizations that a predetermined amount of the supply has just been consumed, at whatever random time that condition obtains. These electrical characterizations are readily identified and stored at a remote center, by equipment operating upon data in digital form, where the accurate integrated consumption through each of a multitude of remote meters is always currently available. Information of this character is highly useful for and is applied for purposes of programming operations by the utility and for automatic computations of customer billing based upon complex rate structures. Meter readers are not required, nor is it necessary that long-term integrations and visible registrations be developed by the meters at the consumer sites.

Such automatic meter reading entails electrical communication between the consumer sites and remote data processing center. While the communications links may be of any known form, wired lines are favored because of their reliability and high degree of immunity to certain interferences. However, the costs and complexities of separate wiring between a reading center and the consumer sites served by the utility, which may extend across vast territories, comprise strong deterrents to widespread use of automatic reading systems and are therefore to be avoided. According to the present teachings, such difficulties are overcome and economies are promoted through exploitation of ground or earth paths which are in circuit with grounded neutral lines of conventional electric power service mains. A major element of total cost of a fully wired communication link for an automatic reading system of the aforementioned types appears in the local communications wiring which must extend between the sites of distribution transformers and the numerous individual homes or other loads served by these transformers; on the other hand, these localized distribution areas are now advantageously found to be capable of affording communications links, for automatic meter reading purposes, which are conveniently isolated and limited to relatively small sections of system loads, such as are particularly desirable for practice of preferred automatic reading techniques.

Therefore, it is one of the objects of the present invention to provide novel and improved automatic metering in which the costs and complexities of communications are minimized through use of unique ground couplings.

A further object is to provide an improved automatic reading and billing system, for use with a network of utility meters, wherein communication links are established via circuits including the earth and grounded neutral wiring of substantially balanced electrical power service mains.

Still further, it is an object to provide improved automatic electric watthour meter reading equipment wherein the meters of each section of meters served by a local distribution transformer having a grounded neutral secondary circuit are automatically read by way of an advantageously isolated communication link developed through the earth and the grounded neutral wiring of electric power mains.

By way of a summary account of practice of this invention in one of its aspects, each of a section or group of electrical watthour meter installations at neighboring consumer locations served by a common distribution transformer is equipped with a special pulse coding stage, in addition to a generally conventional power stage including an electric induction watthour meter motor rotating a pivoted conductive disk at an angular velocity proportional to the electric power being drawn by the associated consumer load from single-phase grounded service mains.

The rotatable disk in each meter power stage actuates a binary encoder in the associated coding stage, such as a rotatable encoder having a binary coding pattern marked upon it to characterize its angular orientations, and thereby translates its integrations of power consumption into unique binary coded data which may be read through a scanning of the encoder. Such scanning, along a predetermined path fixed in relation to the rotatable encoder, is preferably responsive to a readout-initiating signal which interrogates the meter installation periodically and causes a binary electrical-signal designation of meter integrations to be produced, together with a binary electrical-signal designation of the meter installation which is making its report at any time. These electrical binary codes must be transmitted to a remote reading center where they can be recorded for distinctive storage identifying the various meter installations which are involved. Ordinarily, the transmission would involve separate wired lines or other complicated and costly communications networks between each consumer site and the remote reading center or an intermediate stage of the system. However, this invention recognizes that only a relatively small group of consumer installations should be assigned a given system binary coding, which can then involve only relatively few bits and can thereby reduce the complexity and expense of coding and decoding equipment, leaving it to other equipment to distinguish between reports from different groups. Moreover, it is recognized that suitable grouping is inherently established by the electrical power service mains feeding consumer locations from local distribution transformers. Still further, it is recognized that grounded power service mains, such as conventional single-phase three-wire service mains with grounded-neutral or two wire grounded service mains provide an additional electrical circuit, through the earth and through the neutral service lead, which is remarkably free of interference and unbalance signals in the service mains themselves and is of sufficiently low impedance to permit advantageous communications between each of the consumer sites and their common distribution transformer site. Accordingly, the earth or grounding connection between service mains at each consumer location is brought into an inductively-coupled relationship with the readout equipment of the coding stage at the same location, as by way of a current transformer, and the binary coded signals which are developed are thereby applied to the earth-circuit communication link. In turn, the metering signals are inductively extracted from the earth-circuit communication link via the grounding connection between earth and the neutral wire of the distribution transformer secondary. Additional communications circuits, relatively few in number and of any preferred conventional form, couple the coded data to the remote reading center of the system where a known storage means provides the basis for automatic billing and consumer demand computations.

Although the aspects of this invention which are believed to be novel are set forth in the appended claims, the details of preferred embodiments and practices of the invention, and the further objects and advantages thereof, may be most readily comprehended through reference to the following description taken in connection with the accompanying drawings, wherein:

FIGURE 1 portrays an automatic reading and computation system associated with an electric power distribution network and embodying practices of this invention, the illustrations being partly in schematic and partly in block form;

FIGURE 2 represents part of an improved automatic reading and computation system, in block and schematic forms, and provides details of one banked distribution transformer arrangement; and FIGURE 3 is a partial system diagram providing further details of a meter installation in two-way communication with remote automatic metering equipment.

The apparatus illustrated in FIGURE 1 is designed to cooperate with a number of electrical distribution sections each including a relatively large group of consumer electric meter installations, of which those numbered 4 and 5 represent the first and last of a multiplicity of meter installations served by one secondary, 6, of one local distribuation transformer installation, 7. Three-wire service mains 8 leading from the distribution transformer secondary 6 make single-phase power available to the various consumer loads, such as loads 9 and 10, and exhibit about 120 volts between the grounded common bus 8a and each of the other two busses 8b and 8c. Excitation of the local distribution transformer installation 7 is derived from busses 11 and 12 which emanate from a conventional power generating station 13 and from such conventional intermediate power distribution equipment, 14, as transformers, switchgear, and the like. It should be understood that the power generating and distributing equipment usually feeds other distribution transformers as well, by way of other branches of a power network served by other busses, such as those numbered 15 and 16, and that in these respects only a portion of a large complete network is depicted in FIGURE 1.

Traditional practice for the reading of meters at each consumer location has called for readers to visit and record the visible integrated registrations of the power consumed during the interval since the last such visit; however, this is avoided in the FIGURE 1 apparatus by automatic electric reporting of the measurements of each meter to memory and computation apparatus of known forms in a reading center 17 which is at a remote site such as that of a utility company office where consumer demand and billing information is ordinarily processed. For these purposes, special encoding stages of all the meter installations in each section or group of meters are coupled with the remote automatic reading center through intermediate section equipment 18. The latter equipment serves a number of sections, such as those represented by communication lines 19, 20 and 21, and may be situated at a convenient location intermediate these sections and the reading center 17 to perform a selective switching which sequentially couples all of the associated sections with the reading center over one communication line 22. In turn, the reading center also serves a number of such section equipments, which apply their selectively switched outputs to it over other communication lines, 22a, 22b, whereby a community of tens of thousands of consumers may readily be served by a system including but one reading center, a number of section equipments, and a number of sections of many meter installations feeding each of the section equipments.

The individual meter installations each include a power-responsive stage and automatic reading equipment, identified by reference characters 23 and 24, respectively, in the case of meter installation 4, and by reference characters 25 and 26, respectively, in the case of meter installation 5. Conveniently, the power-responsive stage comprises an induction watthour meter unit, as illustrated for the stage 23, which includes the conventional magnetic structure 27, potential and current windings 28 and 29, and a pivoted conductive disk 30 rotated at an angular velocity proportional to the electric power being drawn by the load, whereby the angular travel represents an integration of the electric power consumed. While the customary register mechanisms may also be connected with the disk, for visual checking of its integrations, or in those instances where existing types of meters are converted for practice of automatic reading techniques, this is not essential and preferably the disk alone is coupled with the automatic reading equipment by way of a drive shaft connection 31. Automatic reading equipment 24 and 26 may assume a number of forms, the exact details of which are not critical to purposes of disclosure of the present invention, but in general it is preferred that such equipments respond to actuations by drive shaft connection 31 by producing distinctive electrical output signals which either characterize the actual amount of power integrated by the meter at any time or characterize each successive occasion when the meter has integrated the flow of power of a predetermined incremental amount, such as a 200 watthours amount. Depending upon the type of automatic reading equipment which is selected for use in the meter installations, these equipments may report their information at random times, or in an automatically-timed sequence, or in a predetermined chain-reaction sequence, or upon command from electrical interrogation signals transmitted to them from the section equipment or reading center. Preferably, the electrical output signals developed by the automatic reading equipments are in the form of binary-coded pulse trains the codings of which both characterize the metered data and identify the meter installations making the reports. The data contained in the pulse trains are conveniently recorded and processed at the reading center 17, by known forms of magnetic and electronic equipment exploiting digital data-handling and computation techniques.

Data signals appearing in the output leads of the automatic reading equipments, such as leads 24a and 26a, must be transmitted to the reading center 17 for the aforementioned purposes. In this transmission, reliability should be high and interference signals obviously should be minimized, and simple wired lines prove to be most attractive in this respect. However, separate wired lines connected with the many consumer sites constitute a major item of communications cost in an automatic reading system. According to the present invention, the advantages of separate wired lines are secured, without the attendant expense and complexities, by establishing communications links through the earth and through existing grounded common or neutral electric service connections. The latter are provided routinely, and in the case of the three-wire single-phase service lines 8 depicted in FIGURE 1 the common lead 8a is earthed both by grounding connections, 32 and 33, at the consumer sites and by a grounding connection 34 made at the center 35 of the local distribution transformer secondary 6. As is well known, distribution equipment and circuitry are normally grounded for purposes of providing maximum protection by limiting the voltage stress of insulation to ground, providing maximum safety to personnel who operate or come in contact with electrically energized apparatus, and stabilizing circuit voltages to ground. Earthing sites 32a, 33a and 34a serve these purposes, as well as the further important purposes of establishing communication links, and are in good electrical connection with one another. Resistance of the earth path is inversely proportional to the cross-sectional area, and it is for this reason that even relatively poor conductivity of the earth nevertheless admits a flow of appreciable currents between spaced positions. Virtually all of the resistance is encountered in the earth immediately surrounding the grounding rods, pipes or the like which establish the grounding connections, at which locations the cross-sectional areas of earth involved are relatively small, and it is therefore important to efficiency that such connections be well made. A plurality of electrical circuit loops can then be traced through common service lead 8a grounding lead 34, earth connection 34a, the earth, and through each of the meter installation earth connections and grounding leads, such as connections 32a and 33a and leads 32 and 33. The earth paths of these electrical circuit loops all tend to possess low resistance characteristics, despite their differences in lengths, for reasons already mentioned.

Coupling of coded output signals from the automatic reading equipments of the meter installations into the earth circuit loops should neither interfere with the positive grounding nor introduce high impedances. Inductive couplings are therefore preferred, inasmuch as secondary windings which appear in the earth circuit loops may then be selected to offer only very low resistance. Current transformers 36 and 37 are typical of such couplings, with the schematic representation of transformer 37 illustrating that the secondary may approach a linear conductor form. Primaries 38 and 39 of these transformers are energized by the output signals in leads 24a and 26a, respectively, and it is highly desirable that these output signals be of a high power level such as may be insured by power amplification in the automatic reading equipments 24 and 26. Transformer 40, having its primary 41 serially in the grounding lead 34, couples the reported metering signals into the single wired-line communication link 19 which serves section equipment 18, although this transformer may be entirely eliminated where the section equipment is close at hand to the distribution transformer 7 and the resistance of line 19 is therefore not excessive. Consistent with requirements of the earth circuit loops, the transformer 40 may be of the voltage step-up type which advantageously may have only a low-impedance primary in the earth circuitry while having its multi-turn secondary 42 of relatively high impedance substantially isolated in the communication link 19. Amplifier 43 in communication link 19 provides a boost of signal strength where needed to overcome circuit and line losses and to raise to a more useful amplitude the relatively small intelligence signals appearing in ground lead 34. In the latter connection, it is noted that each of the earth circuit loops is in part inherently paralleled with parts of the others, and the full signal developed in the secondary of any current transformer in any meter installation therefore cannot be fully duplicated in the ground lead 34 of the distribution transformer; however, for some reason not yet explained, the signals in the common ground lead are advantageously larger than would be routinely predicted from merely taking cognizance of the number of paralleled parts of the earth circuit loops, and this promotes exploitation of the earthed communication network. Further, it should be noted that the unbalanced power circuit currents in the service mains of a three-wire distribution system flows largely through the neutral or common wire. Only a small portion of such unbalanced currents flow in the earth portion of the network. Thus, the unbalanced currents do not interfere with the earth circuit communications of this invention.

In FIGURE 2, reference character 44 designates the usual form of generating and distributing equipment, including a power plant and its associated switchgear, transformers and transmission lines, one of the latter being numbered 45 and comprising a three-phase three-wire transmission line. A local distribution transformer array 46 is supplied from this line and is shown to comprise three single-phase distribution transformer sections 47, 48 and 49, the primaries 50, 51 and 52 of which are in a delta connection by virtue of their separate couplings across different pairs of the transmission line busses. Secondary 53 of transformer section 48 is of a center-tapped construction which provides a single-phase output upon a three-wire distribution line comprising busses 54 and common bus 55, the common bus 55 of which is grounded near the distribution transformer by way of a grounding lead 56 connected to earth at the grounding site 57. One typical meter installation, 58, is illustrated in association with a consumer load 59, and its integrating meter unit 60 actuates the automatic meter reading equipment 61 through the coupling 62 in a manner similar to that described in connection with the like apparatus of FIGURE 1. Electrical output signals developed by the reading equipment 61 in response to actuations by meter 60, and characterizing the meter integrations of electrical power consumed by the load 59, are applied to one of the windings, 63, of a transformer 64, from whence they can induce corresponding output signals in the secondary 65 which is part of the grounding lead 66 connected between common line 67 and earth connection 68 at the consumer location. A relatively low resistance conducting path is established by the earth between the earthing provisions 68 at the consumer site and the earthing provisions 57 at the remote distribution transformer site. This path, together with the series path including grounding leads 56 and 66 and common busses 55 and 67, establishes an electrical circuit loop which is substantially independent of the electrical conditions in the power service circuitry. The induced output signals therefore appear in grounding lead 56, from whence they are inductively coupled into communication link 69 serving section equipment 70 by transformer 71. Remote automatic reading center 72 in turn receives corresponding output signals from the section equipment 70, over a communication link 73, and performs the needed memorizing and calculations in accordance with known techniques.

Secondary 74 of distribution transformer 75 in FIGURE 3 similarly excites its three-wire single-phase transmission lines 76, the common line 77 of which is earthed at 78 by a ground lead 79. In this instance, the grounding at or near the distribution transformer location is achieved through windings of two transformers, 80 and 81, which afford inductive couplings for both an input and output, respectively, of electrical signals in an earth circuit communication loop. In each consumer meter installation, such as installation 82, there is likewise a pair of transformers, 83 and 84, interposed between the common-line connection of a grounding lead 85 and its earth connection 86. One of these, transformer 83, inductively couples the electrical output of meter readout equipment 87 into the earth circuit, after its amplification by amplifier 88. The other, transformer 84, inductively couples electrical meter-interrogation signals in the earth circuit with readout initiating equipment 89, after appropriate amplification by amplifier 90. These provisions establish a two-way communication link, through the circuit loop including the earth and common bus 77 from the local distribution transformer. Such two-way communication is important in automatic reading systems which depend upon application of interrogation signals to the automatic readout equipment for the meters, for purposes of initiating readouts in a predetermined sequence and within predetermined periodic intervals, or in accordance with an other program of command reading. Interrogation and two-way communication are not essential in all forms of automatic reading systems, however, because some of these may have the meter installations timed automatically for reporting in a predetermined sequence, or the installations may report at such random times as they happen to integrate successive consumptions of predetermined incremental amounts of energy, for example.

The FIGURE 3 system represents a preferred type in which the integrating meter unit, 91, drives a binary encoder 92 through a mechanical coupling 93. One suitable binary encoder comprises a code disk or code wheel or wheels with permanent code patterns thereon, and the patterns and rate of rotation of the encoder in relation to the rate at which the load 94 consumes power are so proportioned that the coding at every instant indicates the power consumption to within a small amount, such as 200 watthours, of the exact value. The 200 watthour figure represents one acceptable resolution in measurements of electric power consumption. At intervals of about fifteen minutes, the encoder is read out, or scanned by readout equipment 87 to develop an output in the form of an electrical pulse train in which the presence or absence of pulses in successive periods during the reading operation constitute binary coding "bits." The pattern of pulses in the train characterizes the angular orientation of the encoder at the time of reading and, hence, the integration of power made up to that time of scanning. Readout equipment 87 may be of a mechanical wiping or optical scanning type and performs its readings or scanning responsive to control exercised by readout initiating equipment 89. The latter equipment may be in some cases include a simple time switch which periodically initiates the readout, but in the illustrated system it preferably includes a known form of electrical detector which responds to a distinctive interrogation signal applied to it by way of the earth circuit transformer 84, such as a signal of predetermined frequency, and in turn actuates a solenoid or equivalent torque motor which powers the readout equipment wiper arm. The interrogation signals are conveniently developed by an interrogation device 95 which constitutes part of the remote section equipment 96 and which preferably operates in synchronism with the input switching device 97 of section equipment 96. For purposes of distinguishing the coded reports from the various meter installations in each group of meter installations, a further binary encoder, such as meter encoder 98, is added to each meter installation, this encoder also being read or scanned by the readout equipment 87 and preferably just in advance of its scanning of the meter-reading encoder 92. Encoder 98 produces a fixed code, rather than one which varies with the meter reading, and this code is also preferably in the form of a pulse train. The minimum number of bits in this meter code, each signified by the presence or absence of pulses during predetermined times during the scanning operation, is determined by the number of meter installations which are to be distinguished from one another in each group or section of meter installations, it being known that each bit of information added to a message doubles the number of possible selections and that the progression is one which increases by the power of two. It should be understood that in alternative systems wherein the readout equipment includes a timer, or wherein the various automatic reading stages of the meter installations are connected in a chain to respond sequentially to an interrogation signal, the meter encoder 98 may be eliminated inasmuch as the readouts will occur in a known sequence which is enough to identify the reporting meter installations. In any event, the binary-coded output pulses from the readout equipment are applied to an input of the section equipment 96 via the earth circuitry described hereinbefore, and, thence, to the remote reading center 99 over another communication link 100.

Input switching device 97 in section equipment 96 may comprise a conventional form of stepping switch for making the needed connections, in sequence, with each of a number of earth circuits serving different groups of meter installations. The scanning of each meter installation may be accomplished in less than a second, if desired, so that a large number of meter installations may be read in a system which performs successive readings during successive fifteen-minute intervals, for example. In accordance with well-known techniques, the binary-coded pulses may be modulated upon a carrier of a suitable frequency, preferably a frequency sufficiently different from the usual sixty-cycle power frequency to minimize any possibility of interference from the power service mains. The interrogation signals applied by interrogation device 95 are also preferably of frequencies significantly different from the power frequency, and are also preferably of frequencies significantly different from the frequency of the carrier of the coded pulse signals, such that each of the input and output coupling transformers at each of the distribution transformer and consumer sites will be designed to exhibit relatively high circuit impedances at the frequencies of the other.

Reading center 99 also involves a switching device, 101, which serves to connect the various communication links from a number of section equipments to different ones of the two like recorders 102 and 103 during alternate fifteen-minute intervals. This switching device may also be of a conventional form, and the two recorders 102 and 103 are likewise of conventional form. All of the section equipment outputs are memorized simultaneously, on different tracks or sections of the recorder with which they are coupled during any interval. These two recorders alternately play back their memorized pulse-coded data to a demand recorder 104 preferably in the form of a tape recorder, and this in turn delivers the data accumulated over a long period to digital data processing equipment 105. Within the data processing equipment, a computer tape is prepared from the readings fed from recorder 104, and a billing factor may also be introduced to reflect the different charges for consumptions during different hours of the day, or the like.

It should be recognized that the automatic reading equipments associated with the meter installations may assume forms other than those already described herein. By way of example, system operation is highly advantageous where each induction meter motor unit simply actuates a switch alternately from one to another of two states temporarily, such as from open to a momentary closure, each time the rotating meter disk has rotated through a predetermined angle which characterizes the flow of a predetermined amount of energy, such as 200 watthours of energy, to the associated consumer load. In such instances, the automatic reading equipments, such as equipments 24 and 26 in FIGURE 1, each further include a pulse generator which develops a binary-coded burst or train of pulses in response to each switch closure, the pulses being distinctively coded to identify the meter installation making its report. Preferably, the pulse generator is in the form of a multi-contact mercury switch in which a ball of mercury within a movable tube rolls across and momentarily shorts sets of distributed electrical contacts to form the pulse coding, the tube of the mercury switch being rotated, to cause the rolling action of the mercury ball, by a thermal torque generator energized by the power service mains through the disk-actuated switch. The coded signals so developed by the meter installations occur at random times, depending upon when each of the various consumer loads happens to complete consumption of another successive predetermined increment of energy. These coded signals are transmitted over the earth-circuit communication link which has been described, and are preferably reproduced at a higher speed by a repeater in the section equipment 18. The repeater also preferably adds a further train of coding pulses which identifies the particular section or group of meter installations from which the meter-coding pulses are received. At the remote reading center 17, the doubly-coded signals are sorted and stored in a random access memory array which is capable of storing the binary bit information that any or all of the meter installations have reported from the consumption of one predetermined increment of energy. The records of stored information are periodically extracted from the memory array, in a predetermined known sequence however, at intervals less than that during which more than one output signal can be developed by any one meter installation. Binary codings of data read out of the random access memory at these intervals are totalized to provide demand readings for a suitable longer interval, such as an hour, and further storage and computations for filling and demand calculation purposes are then readily performed within equipment 17.

As will be obvious to those skilled in this art, various changes and modifications may be made in the illustrated system. It will also be apparent that a two wire grounded system may be used, rather than the three wire, grounded-neutral system used for the purpose of illustration. It should therefore be understood that the embodiments of this invention described herein are intended to be of a descriptive rather than a limiting character, and that various changes, combinations, substitutions or modifications may be practiced in accordance with these teachings without departing either in spirit or scope from this invention in its broader aspects.

What I claim as new and desire to secure by Letters Patent of the United States is:

1. Automatic metering apparatus for use with an electric power distribution system having transmission lines connecting a distribution site with a remote consumer site and including one transmission line which is grounded, comprising a meter unit at the consumer site integrating the supply of a consumer load by service mains, readout means for producing electrical output signals characterizing the supply conditions integrated by said meter unit, means connecting said readout means with said meter unit for response to integrations thereof, first grounding means at said consumer site making a low-resistance connection between said one transmission line and the earth and including first coupling means for introducing said electrical output signals from said readout means in circuit therewith, means connecting the output of said readout means with said coupling means, second grounding means at said distribution site making a low-resistance connection between said one transmission line and the earth and including second coupling means in circuit therewith for producing an output of electrical signals responsive to said electrical output signals in said first grounding means, and data-processing means connected in circuit with said second coupling means and supplied with data by the electrical output signals therefrom.

2. Automatic metering apparatus for use with an electric power distribution system having transmission lines connecting a distribution site with at least one remote consumer site and including one transmission line which is grounded, comprising a utility meter unit at the consumer site integrating the supply of a consumer load by service mains, readout means for producing electrical output signals characterizing the supply conditions integrated by said meter unit, means connecting said readout means with said meter unit for response to integrations thereof, first grounding means at said consumer site connecting said one transmission line to earth and including a first current transformer in circuit therewith, means applying the electrical output signals from said readout means to said current transformer to induce corresponding electrical signals in said first grounding means, second grounding means at said distribution site connecting said one transmission line to earth and including a second transformer in circuit therewith for producing an output of electrical signals responsive to said electrical signals induced in said first grounding means, and data-processing means connected in circuit with said second transformer and supplied with data by the electrical signal outputs thereof.

3. Automatic metering apparatus for use with an electric power distribution system having substantially balanced transmission lines connecting a distribution site with a plurality of remote consumer sites and including one common transmission line, comprising a different electric meter unit at each of said consumer sites integrating the supply of electric power to a different consumer load by said transmission lines, different readout means at each of said consumer sites for producing electrical output signals characterizing the power integrations by said meter units, means connecting each of said readout means with a different one of said meter units for response to integrations thereof, different grounding means at each of said consumer sites connecting said one transmission line to earth and including a different current transformer in circuit therewith, different means at each of the consumer sites applying the electrical output signals from said readout means to said current transformer at that consumer site to induce corresponding electrical signals in the grounding means at that consumer site, grounding means at said distribution site connecting said one transmission line to earth and including coupling means in circuit therewith for producing electrical output signals responsive to the electrical signals induced in the grounding means at said consumer sites, and data-processing means connected in circuit with said coupling means and supplied with data by the electrical output signals therefrom.

4. Automatic metering apparatus for use with an electric power distribution system having distribution transformers the secondaries of which each supply different three-wire single-phase transmission lines connected with a different group of remote consumer sites and having a common transmission line, comprising a different electric meter unit at each of said consumer sites integrating the supply of electric power to a different consumer load by said transmission lines from one of said distribution transformers, different readout means at each of said consumer sites for producing electrical output signals characterizing the power integrations by said meter units, means connecting each of said readout means with a different one of said meter units for response to integrations thereof, different grounding means at each of said consumer sites connecting said common transmission to earth and including a different coupling transformer means in circuit therewith, different means at each of the consumer sites applying the electrical output signals from said readout means to said transformer means in the grounding means at that site to induce corresponding electrical signals in the grounding means at that site, different grounding means at the site of each of said distribution transformers connecting the common transmission line at that site to earth and including coupling transformer means in circuit therewith for producing electrical output signals responsive to the electrical signals induced in the grounding means at each of the group of consumer sites connected with the same common transmission line, and data-processing means connected in circuit with said coupling transformer means in the grounding means at the sites of said distribution transformers and supplied with data by the electrical output signals therefrom.

5. Automatic metering apparatus as set forth in claim 4 wherein periodicity of said electrical signals induced in said grounding means is different from the periodicity of alternating current electric power supplied by said transmission lines.

6. Automatic metering apparatus as set forth in claim 5 wherein each of said readout means includes readout-initiating means actuating said readout means to produce said electrical output signals responsive to electrical interrogation signals, and further including an interrogation device producing said electrical interrogation signals, means applying said electrical interrogation signals to said coupling transformer means at said distribution transformer sites to induce corresponding interrogation signals in the grounding means at said transformer sites, and means applying output signals induced in the coupling transformer means at each of said consumer sites by said interrogation signals to said readout-initiating means at said consumer sites.

References Cited by the Examiner
UNITED STATES PATENTS

| | | | |
|---|---|---|---|
| 1,518,683 | 12/1924 | Baker | 340—310 |
| 1,587,122 | 6/1926 | Harlow | 340—310 X |
| 1,597,828 | 8/1926 | Rouck | 340—310 |
| 1,922,193 | 8/1933 | Boddie | 179—2.5 |
| 1,955,043 | 4/1934 | Yates | 340—151 |
| 1,979,315 | 11/1934 | Cotter | 179—2.5 |
| 1,955,043 | 4/1934 | Yates | 340—151 |
| 2,134,416 | 10/1938 | Place et al. | 179—82 |
| 2,290,753 | 7/1942 | Keckley | 340—310 X |
| 2,327,251 | 8/1943 | Derr | 340—310 X |
| 2,344,254 | 3/1944 | Leathers | 340—150 |
| 2,574,458 | 11/1951 | Atkinson et al. | 340—310 |
| 2,587,213 | 2/1952 | Polin | 340—310 |
| 2,981,940 | 4/1961 | Garwin | 340—310 |
| 3,048,822 | 4/1962 | Wendt. | |

NEIL C. READ, *Primary Examiner.*

STEPHEN W. CAPELLI, *Examiner.*

K. E. JACOBS, H. I. PITTS, *Assistant Examiner.*